United States Patent [19]
Inamori

[11] Patent Number: 6,070,064
[45] Date of Patent: May 30, 2000

[54] INFORMATION RECEIVING SYSTEM AND A CONTROL METHOD THEREOF

[75] Inventor: Nobuya Inamori, Yokkaichi, Japan

[73] Assignee: Sumitomo Wiring Systems, Ltd., Japan

[21] Appl. No.: 08/925,800

[22] Filed: Sep. 9, 1997

[30] Foreign Application Priority Data

Sep. 20, 1996 [JP] Japan .................................. 8-2491774

[51] Int. Cl.[7] .............................. H04B 17/02; H04B 1/16

[52] U.S. Cl. .................................... 455/277.1; 455/277.1; 455/272; 455/132; 455/133; 455/140; 455/45; 455/186.1

[58] Field of Search ................................ 455/277.1, 272, 455/278.1, 132, 133, 136, 140, 151.4, 152.1, 245, 297, 310, 45, 186.1; 375/347, 349, 340, 325

[56] References Cited

U.S. PATENT DOCUMENTS

| | | | |
|---|---|---|---|
| 5,263,190 | 11/1993 | Taniguchi et al. | 455/297 |
| 5,722,058 | 2/1998 | Umemoto et al. | 455/140 |
| 5,732,337 | 3/1998 | Wargnier et al. | 455/144 |
| 5,742,896 | 4/1998 | Bose et al. | 455/133 |
| 5,794,159 | 8/1998 | Portin | 455/553 |

*Primary Examiner*—Fan S. Tsang
*Assistant Examiner*—Simon Nguyen
*Attorney, Agent, or Firm*—Anthony J. Casella; Gerald E. Hespos; Michael J. Porco

[57] ABSTRACT

An information or broadcast receiving system and a control method therefor are provided for preventing a switch noise generated during the switching of antennas of a receiver provided with a plurality of switchable antennas from deteriorating a receptive state of an other receiver. When a detector 62 of a main controller 3 detects that a radio 1 is receiving an AM broadcast, a signal output device 63 causes an FM multiplex receiver 2 to stop the switching of a main antenna 31 and an auxiliary antenna 32 by a diversity circuit 33 and to select the main antenna 31.

9 Claims, 2 Drawing Sheets

INFORMATION RECEIVING SYSTEM AND A CONTROL METHOD THEREOF

BACKGROUND OF THE INVENTION

1. Field of the Invention

The present invention relates to an information receiving system, adopting a diversity reception method and, particularly to a broadcast receiving system with a radio capable of receiving an AM broadcast and an FM multiplex receiver for receiving an FM multiplex broadcast, including a traffic information, according to a diversity reception method. The invention also relates to a method for controlling an information receiving system, in particular a broadcast receiving system.

2. Description of the Prior Art

Some of the recent car navigation systems are such that an FM multiplex broadcast, including traffic information, such as traffic regulations, a jam and a traffic accident, is received by an FM multiplex receiver and is displayed as character information or image information in a display device mounted near a driver's seat of a vehicle.

The FM broadcast radio wave received by the FM multiplex receiver reaches a receiving vehicle from a broadcast station through various paths, including being reflected by buildings, mountains and the like. Thus, a reception problem called "multipath distortion" occurs in the FM broadcast radio wave. A diversity reception method has been adopted to receive FM multiplex broadcast, and reduces the influence of multipath by switchingly selecting one antenna having a satisfactory receptive state from a plurality of antennas.

In the case that such a car navigation system is mounted on a vehicle, the FM multiplex receiver and a radio capable of receiving an AM broadcast are installed in proximity to each other. A noise generated by switching the antennas of the FM multiplex receiver leaks from the antennas of the FM multiplex receiver and is imported onto a signal received by the radio, with the result that the noise is imposed on the voice outputted from the radio. Further, as generally known, the AM broadcast is an amplitude modulation and is thus more easily affected by the noise which acts on the amplitude than the FM broadcast. Accordingly, the influence of the noise generated by switching the antennas is larger when receiving the AM broadcast than when receiving the FM broadcast.

A prior art for reducing the influence of the switching of antennas on the radio is such that a switch pulse for instructing the switching of the antenna is inputted to a diode which acts to switch the antennas via an integral circuit comprised of a capacitor and a resistor so as to reduce a noise by smoothing the rise and fall of the switch pulse (Japanese Unexamined Patent Publication No. 56(SHO)-168440).

With the prior art disclosed in the above publication, the noise generated during the switching of the antennas may be reduced considerably, but cannot be completely eliminated. Accordingly, in the case that a radio is installed in a very short distance from the receiver of this prior art, e.g. in the same vehicle, if the antennas are switched while the radio is receiving an AM broadcast, an AM tuner is easily affected by the noise as mentioned above. Thus, the AM tuner is affected even by a reduced level of noise, with the result that the noise is inadvertently imposed on the outputted voice.

An object of the present invention is to provide an information receiving system and a control method therefor which are capable of preventing the influence of a switch noise generated during the switching of antennas by a receiver provided with a plurality of switchable antennas from deteriorating a receptive state of an other receiver.

SUMMARY OF THE INVENTION

According to the invention, there is provided an information receiving system, comprising a first receiver for receiving a first information radio wave, and a second receiver comprising a plurality of antennas and antenna selection means for selecting one antenna having a satisfactory receptive state from the plurality of antennas. Detection means is provided for detecting reception by the first receiver, and switch stop means is provided for stopping the switching of the antennas by the antenna selection means if the detection means detects the reception by the first receiver.

Thus, the influence of the switch noise generated during the switching of the antennas of the second receiver, in particular of a FM multiplex receiver, on the first receiver can be eliminated, the first receiver being preferably receiving an AM information broadcast.

According to a preferred embodiment, the first receiver comprises a radio for receiving an AM broadcast or information radio wave, and/or wherein the second receiver is adapted to receive an FM multiplex broadcast or information.

Preferably, the first receiver can be switched between a first receiving modus or state, in particular an AM broadcast receiving modus, and a second receiving modus or state, in particular an FM broadcast receiving modus.

Further preferably, the detection means detects the receiving modus of the first receiver, and wherein the switch stop means stops the switching of the antennas by the antenna selection means if the detection means detects that the first receiver is in its first receiving modus, in particular in the AM broadcast receiving modus.

According to the invention, there is further provided a control method for controlling an information receiving system, in particular according to the invention, comprising a first receiver and a second receiver comprising a plurality of antennas and antenna selection means for selecting one antenna having a satisfactory receptive state from the plurality of antennas. The method comprises the steps of reading a signal from the first receiver and then discriminating whether the first receiver is in its first or second receiving modus or state. The method proceeds by inhibiting or stopping the switching of the antennas by the antenna selection means, in the case that the first receiver is in its first receiving modus or permitting or allowing the switching of the antennas by the antenna selection means, in the case that the first receiver is in its second receiving modus.

According to a preferred embodiment of the invention, the inhibiting step comprises the step of fixedly setting a predetermined antenna out of the plurality of antennas.

Preferably, the permitting step comprises the step of switching the antennas by the antenna selection means in the second receiver.

Further preferably, in the inhibiting step, the switching of the antennas by the antenna selection means is inhibited, in the case that the reception of an AM broadcast by the first receiver is detected.

According to a further preferred embodiment, a broadcast receiving system comprises a first receiver for receiving a first broadcast radio wave and a second receiver comprising a plurality of antennas and antenna selection means for selecting one antenna having a satisfactory receptive state from the plurality of antennas. The system further comprises detection means for detecting reception by the first broadcast receiving system, and switch stop means for stopping the switching of the antennas by the antenna selection means if the detection means detects the reception by the first receiver.

Accordingly, during the reception by the first receiver, the switching of the antennas of the second receiver is stopped. Thus, the deterioration of the receptive state of the first receiver due to the influence of the switch noise generated by the switching of the antennas of the second receiver can be prevented.

Preferably, the broadcast receiving system may comprise a radio for receiving an AM broadcast radio wave, and a second receiver which comprises a plurality of antennas and antenna selection means for selecting one antenna having a satisfactory receptive state from the plurality of antennas and is adapted to receive an FM multiplex broadcast. This preferred system further comprises detection means for detecting the reception of an AM broadcast radio wave by the radio, and switch stop means for stopping the switching of the antennas by the antenna selection means if the detection means detects the reception of the AM broadcast radio wave by the radio.

Accordingly, while the radio is receiving an AM broadcast which is easily affected by the switch noise, the switching of the antennas of the FM multiplex receiver is stopped. Accordingly, the importation of a noise to the received AM broadcast signal due to the influence of the switch noise generated by the switching of the antennas of the FM multiplex receiver can be prevented, and the AM broadcast can be satisfactorily made audible.

A preferable control method for a broadcast receiving system comprises a first receiver and a second receiver comprising a plurality of antennas and antenna selection means for selecting one antenna having a satisfactory receptive state from the plurality of antennas is characterized in that the switching of the antennas by the antenna selection means is stopped when the reception by the first receiver is detected.

Another preferable control method for a broadcast receiving system comprises a radio for receiving an AM broadcast radio wave and a second receiver which comprises a plurality of antennas and antenna selection means for selecting one antenna having a satisfactory receptive state from the plurality of antennas and is adapted to receive an FM multiplex broadcast is characterized in that the switching of the antennas by the antenna selection means is stopped when the reception of the AM broadcast by the radio is detected.

These and other objects, features and advantages of the present invention will become more apparent upon a reading of the following detailed description and accompanying drawings.

DETAILED DESCRIPTION OF THE PREFERRED EMBODIMENT

Figure 1:
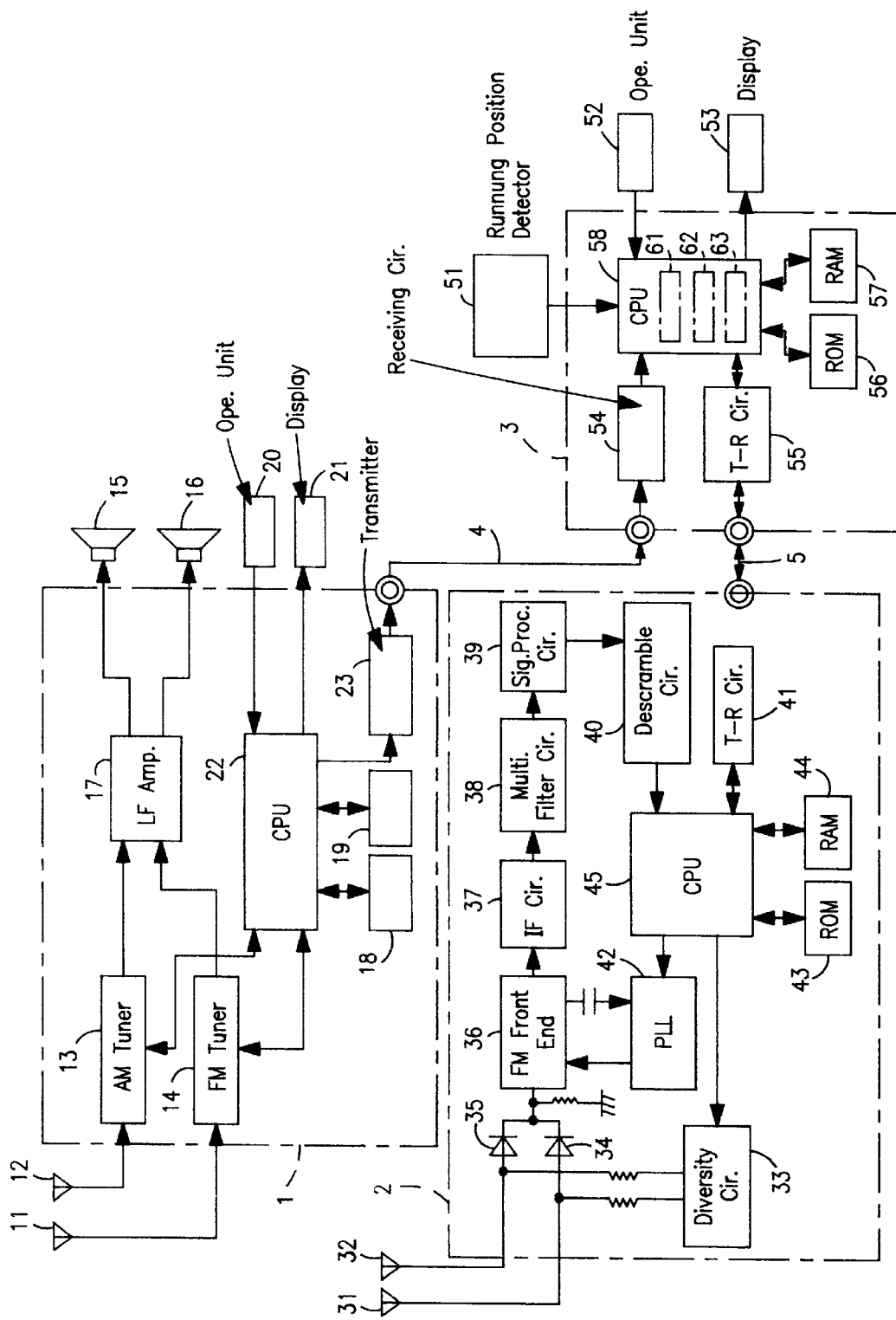
FIG. 1 is a block diagram of an information receiving system according to one embodiment of the invention.

FIG. 1 is a block diagram of an information or broadcast receiving system according to one embodiment of the invention. This broadcast receiving system is, as shown in FIG. 1, provided with a radio 1 as a first receiver for receiving an AM information or broadcast and/or an FM information or broadcast, an FM multiplex receiver 2, as a second receiver, which adopts particularly a diversity reception method and receives an FM multiplex information or broadcast, and a main controller 3. The main controller 3 controls the FM multiplex receiver 2 via a bus 5 while monitoring the type of reception at the radio 1, i.e. whether the radio 1 is receiving an AM broadcast or FM broadcast or it is off, via a bus 4.

The radio 1 includes an AM tuner 13, an FM tuner 14, a low frequency amplifying circuit 17 for outputting the signals received from the respective tuners 13 and 14 to L- and R- speakers 15 and 16, a CPU 22, and a transmitter circuit 23. The CPU 22 is connected with a ROM 18 and a RAM 19; controls the AM tuner 13 and the FM tuner 14 based on an input from an operation unit 20; and displays an information necessary for the operation in a display device 21. The transmitter circuit 23 is provided between the CPU 22 and the bus 4 for transmitting a signal from the CPU 22 to the bus 4.

Here, the CPU 22 outputs a signal representing whether the radio 1 is receiving an AM information or broadcast or an FM information or broadcast or is off to the main controller 3 via the bus 4.

The FM multiplex receiver 2 includes a plurality of antennas (here, two antennas: main antenna 31 and auxiliary antenna 32), a diversity circuit 33 as antenna selection means, diodes 34, 35, an FM front end 36, an IF circuit 37, a multiplex filter circuit 38, a signal processing circuit 39, a descramble or unscramble circuit 40, a transmit-receive circuit 41, a PLL circuit 42, a ROM 4 3, a RAM 44, and a CPU 45. The diversity circuit 33 switches the main antenna 31 and the auxiliary antenna 32. The diodes 34, 35 are separately connected with the main antenna 31 and the auxiliary antenna 32, respectively for switching the antennas. The FM front end 36 receives an FM multiplex broadcast radio wave received by the main antenna 31 or auxiliary antenna 32 via the diode 34 or 35. The IF circuit 37 detects an FM multiplex signal converted into an IF signal by the FM front end 36. The multiplex filter circuit 38 determines the presence of a signal from an FM multiplex information or broadcast station in the received signal by extracting only the FM multiplex signal from the detected signal. The signal processing circuit 39 demodulates the extracted FM multiplex signal to correct an error and extracts a packet data included in this signal. The descramble circuit 40 decodes or descrambles the packet data. The transmit-receive circuit 41 transmits and receives the signal to and from the bus 5. The PLL circuit 42 controls a receiving frequency in cooperation with the FM front end 36. The CPU 45 is connected with the ROM 43 and the RAM 44; processes the signals from the descramble circuit 40 and the transmit-receive circuit 41; and controls the diversity circuit 33 and the PLL circuit 42.

In the FM multiplex receiver 2 thus constructed, if the receptive state is deteriorated e.g. by being affected by multipath, the CPU 45 detects this and causes the diversity circuit 33 to switch the main antenna 31 and the auxiliary antenna 32, so that the antenna having a better receptive state is selected.

The main controller 3 includes a running position detector 51, an operation unit 52, a display device 53, a receiving circuit 54, a transmit-receive circuit 55, a ROM 56, a RAM 57 and a CPU 58. The running position detector 51 detects a running position of a vehicle. The operation unit 2 is used to input various instructions and necessary data e.g. for car navigation. The display device 53 allows a driver to see an information, e.g. a road map, traffic information, etc. The receiving circuit 54 receives the signals from the radio 1 via the bus 4. The transmit-receive circuit 55 transmits and receives the signals to and from the FM multiplex receiver 2 via the bus 5. The CPU 58 is connected with a storage means comprised of the ROM 56 or the like permanent storage means (e.g. magnetic storage, CD-ROM, or the like) and the RAM 57 or the like rewritable storage means; controls the FM multiplex receiver 2 by processing various signals received from the receiving circuit 54, the transmit-receive circuit 55 and the operation unit 52; and sends a signal representing a road map, traffic information, etc. to the display device 53, thereby causing the display device 53 to display it.

The CPU 58 outputs a navigation information and/or other information to the display device 53 and controls the FM multiplex receiver 2. The CPU 58 includes a running position controller 61, a detector 62 (detection means) and a signal output device 63 (switch stop means). The running position controller 61 confirms a running position of the vehicle detected by the running position detector 51 on a map stored in the ROM 56 and the RAM 57; gathers a traffic information such as a jam information from the FM multiplex signal sent from the transmit-receive circuit 55, if there is any, in accordance with the signal from the operation unit 52; and outputs the gathered information together with a specified road map as a navigation information to the display device 53. The detector 62 detects, based on the signal from the receiving circuit 54, whether or not the radio 1 is receiving an AM broadcast. The signal output device 63 outputs an antenna switch stop signal to the CPU 45 of the FM multiplex receiver 2 via the bus 5 if the detector 62 detects that the radio 1 is receiving an AM broadcast.

The thus constructed main controller 3 is in its standby state with power constantly supplied from a battery. The FM multiplex receiver 2 receives power from the battery when an accessory switch is on, thereby being activated.

In the broadcast receiving system constructed as above, the main controller 3 controls the FM multiplex receiver 2 while constantly monitoring whether or not the radio 1 is receiving an AM broadcast. While the radio 1 is receiving an AM broadcast, the antenna switch stop signal is outputted from the main controller 3 to the FM multiplex receiver 2. Upon receipt of this signal, while the radio 1 is receiving an AM broadcast, the CPU 45 of the FM multiplex receiver 2 stops the switching of the antennas by the diversity circuit 33, and reception is performed only by the main antenna 31.

Figure 2:
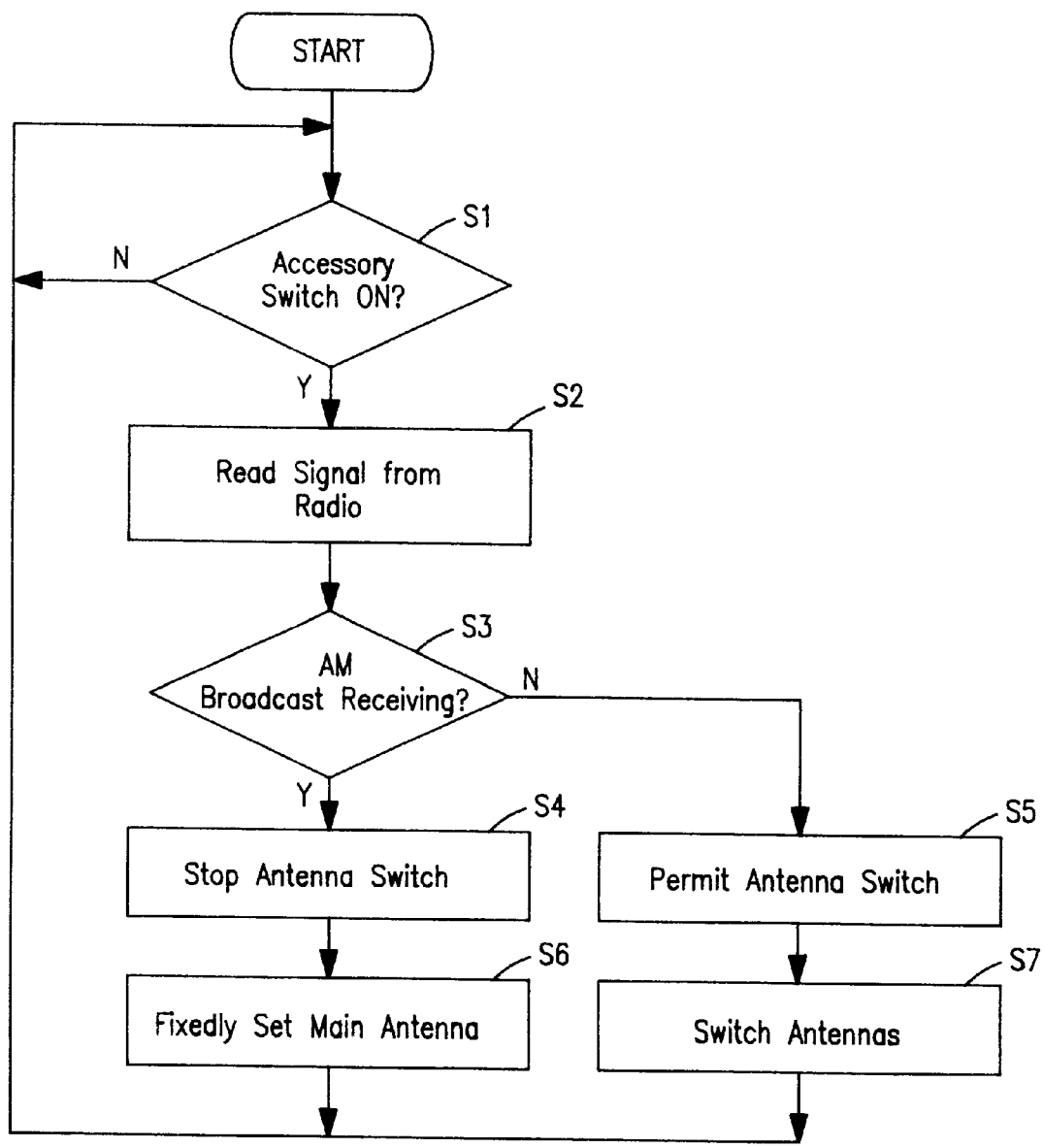
FIG. 2 is a flow chart showing a control of stopping and permitting the switching of antennas in the information receiving system.

Next, a control of stopping and permitting the switching of the antennas is described with reference to FIG. 2.

In Step S1, whether or not the accessory switch is on is discriminated. Step S2 follows if the accessory switch is on, whereas Step S1 is repeated until the accessory switch is turned on if it is off.

In Step S2, the signal from the radio 1 is inputted to the CPU 58 via the bus 4 for a detection as to whether the radio 1 is receiving an AM broadcast or an FM broadcast or it is off.

In Step S3, whether or not the radio 1 is receiving an AM broadcast is discriminated. Step S4 follows if the radio 1 is receiving an AM broadcast, whereas Step S5 follows unless otherwise.

In Step S4, the antenna switch stop signal is outputted from the main controller 3 to the FM multiplex receiver 2 to stop the switching of the antennas. In Step S6, the main antenna 31 is fixedly set as a selected antenna and this routine returns to Step S1. Further, in Step S5, the output of the antenna switch stop signal is stopped, thereby permitting the switching of the antennas. Then, in Step S7, the antennas are switched in the FM multiplex receiver 2 if necessary and this routine returns to Step S1.

With the control shown in this flow chart, the switching of the antennas is controlled by repeating the processing of Steps S1 to S7. While the radio 1 is receiving an AM broadcast, the main antenna 31 is fixedly set as a receiving antenna. If the radio 1 is not receiving an AM broadcast, the antennas are switched according to needs in Step S7.

The above construction can completely eliminate the influence of the switch noise generated during the switching of the antennas of the FM multiplex receiver 2 on the radio 1 which is receiving an AM broadcast. Accordingly, an AM broadcast can be satisfactorily made audible without being affected by the switch noise.

Further, since the switching of the antennas of the FM multiplex receiver 2 is automatically stopped while the radio 1 is receiving an AM broadcast, an operator need not operate the system to give an instruction to the FM multiplex receiver 2 to stop the switching of the antennas.

What is claimed is:

1. An information receiving system, comprising:

a first receiver for receiving a first information radio wave;

a second receiver comprising a plurality of antennas and antenna selection means for selecting one antenna having a satisfactory receptive state from among the plurality of antennas by switching successively between the antennas of said plurality of antennas, the second receiver being an FM multiplex receiver and being independent of the first receiver;

detection means for detecting reception of a first information radio wave by the first receiver, and switch stop means for stopping the switching of the antennas by the antenna selection means if the detection means detects the reception by the first receiver of a first information radio wave.

2. An information receiving system according to claim 1, wherein the first receiver comprises a radio for receiving a selected one of an AM broadcast and an AM information radio wave, and wherein the second receiver comprises means for receiving a selected one of an FM multiplex broadcast and FM multiplex information.

3. An information receiving system according to claim 1, wherein the first receiver is switchable between an AM broadcast receiving modus and an FM receiving modus.

4. An information receiving system according to claim 3, wherein the detection means detects the receiving modus of the first receiver, and wherein the switch stop means stops the switching of the antennas by the antenna selection means if the detection means detects that the first receiver is in the AM broadcast receiving modus.

5. A control method for controlling an information receiving system, comprising a first receiver capable of selectively being placed in a receiving mode and a second receiver comprising a plurality of antennas and antenna selection means for selecting one antenna having a satisfactory receptive state from among the plurality of antennas by switching successively between the antennas of said plurality of antennas, the second receiver being an FM multiplex receiver and being independent of the first receiver, the method comprising the steps of:

discriminating (S3) whether the first receiver is in the receiving modus;

inhibiting (S4; S6) the switching of the antennas by the antenna selection means in the case that the first receiver is in the receiving mode; and permitting (S5; S7) the switching of the antennas by the antenna selection means, in the case that the first receiver is in the receiving mode.

6. A method according to claim 5, wherein the first receiver is capable of being switched between first and second receiving modes, the method further comprising the steps of:

reading a signal (S2) received by the first receiver;

discriminating (S3) from the read signal (S2) whether the first receiver is in the second receiver mode; and permitting (S5; S7) the switching of the antennas by the antenna switching means in the case that the first receiver is in the second receiving mode.

7. A method according to claim 6, wherein in the inhibiting step (S4; S6), the switching of the antennas by the antenna selection means is inhibited, in the case that the reception of an AM broadcast by the first receiver (1) is detected.

8. A method according to claim 5, wherein the inhibiting step (S4; S6) comprises the step of fixedly setting a predetermined antenna out of the plurality of antennas.

9. A method according to claim 5, wherein the permitting step (S5; S7) comprises the step of switching the antennas by the antenna selection means in the second receiver.

\* \* \* \* \*